United States Patent
Yamakawa

(10) Patent No.: US 8,320,066 B2
(45) Date of Patent: Nov. 27, 2012

(54) STORAGE DEVICE AND READ/WRITE PROCESSING METHOD THEREFOR

(75) Inventor: Teruji Yamakawa, Koto-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 312 days.

(21) Appl. No.: 12/776,117

(22) Filed: May 7, 2010

(65) Prior Publication Data

US 2010/0214687 A1 Aug. 26, 2010

Related U.S. Application Data

(63) Continuation of application No. PCT/JP2007/001219, filed on Nov. 7, 2007.

(51) Int. Cl.
*G11B 27/36* (2006.01)
(52) U.S. Cl. ......................................................... 360/31
(58) Field of Classification Search .................... 360/31, 360/53, 71, 77.02; 369/47.3; 714/37; 716/106; 358/3.01, 1.15
See application file for complete search history.

(56) References Cited

U.S. PATENT DOCUMENTS

| | | | | |
|---|---|---|---|---|
| 6,631,976 B2* | 10/2003 | Hamamoto et al. | ............ | 347/35 |
| 6,757,118 B1* | 6/2004 | Walker et al. | ................... | 360/31 |
| 6,775,022 B2* | 8/2004 | Noyes et al. | ................. | 358/1.15 |
| 6,863,367 B2* | 3/2005 | Hamamoto et al. | ............ | 347/23 |
| 7,290,175 B1* | 10/2007 | Kessler et al. | ................... | 714/37 |
| 7,355,803 B2* | 4/2008 | Yang | ............................... | 360/31 |
| 7,458,043 B1* | 11/2008 | Cischke et al. | ............... | 716/106 |
| 7,548,393 B2* | 6/2009 | Chung et al. | ................ | 360/77.02 |
| 7,889,449 B2* | 2/2011 | Tashiro | ........................... | 360/31 |
| 7,911,727 B2* | 3/2011 | Evans et al. | ...................... | 360/71 |
| 2001/0010605 A1* | 8/2001 | Aoki | ............................... | 360/53 |
| 2003/0016602 A1* | 1/2003 | Wada et al. | ................... | 369/47.3 |
| 2006/0114779 A1* | 6/2006 | Wada et al. | ................... | 369/47.3 |
| 2006/0215307 A1 | 9/2006 | Yoshida et al. | | |
| 2007/0005884 A1 | 1/2007 | Hiratsuka et al. | | |
| 2007/0121165 A1* | 5/2007 | Ando et al. | ................... | 358/3.01 |
| 2010/0031307 A1* | 2/2010 | Toyama | ........................ | 725/131 |
| 2010/0079889 A1* | 4/2010 | Leopold et al. | .................. | 360/31 |
| 2010/0202078 A1* | 8/2010 | Sato | ................................ | 360/31 |

FOREIGN PATENT DOCUMENTS

| | | |
|---|---|---|
| JP | 2004-173244 A | 6/2004 |
| JP | 2006-269006 A | 10/2006 |
| JP | 2007-011661 A | 1/2007 |

OTHER PUBLICATIONS

Prior Art Information List.
International Search Report mailed by Japan Patent Office on Dec. 18, 2007.

* cited by examiner

*Primary Examiner* — Fred Tzeng
(74) *Attorney, Agent, or Firm* — Knobbe, Martens, Olson & Bear LLP

(57) ABSTRACT

According to one embodiment, a storage device includes: a control circuit configured to perform a write retry when data writing fails, wherein the control circuit recognizes that read commands are issued at regular intervals for reproducing continuous pieces of data, and upon detecting an error requiring the write retry to be performed in the data writing by a write command received during the reproduction, the control circuit interrupts the data writing, perform data reading to store the data in the buffer memory after allocating a storage area for the data in the buffer memory, and then resumes the data writing.

18 Claims, 7 Drawing Sheets

STORAGE DEVICE AND READ/WRITE PROCESSING METHOD THEREFOR

CROSS-REFERENCE TO RELATED APPLICATIONS

This application is a continuation of PCT international application Ser. No. PCT/JP2007/001219 filed on Nov. 7, 2007 which designates the United States, incorporated herein by reference.

BACKGROUND

1. Field

One embodiment of the invention relates to a storage device configured to read data from and write data on a medium with a head, and to a read/write processing method for the storage device. In particular, one embodiment of the invention relates to a storage device to which a read request for reading out music or video data is periodically issued from an external module, and to a read/write processing method for the storage device.

2. Description of the Related Art

A medium storage device such as a magnetic disk device and an optical disk device is configured to write data on a medium to store the data, and read data from the medium to reproduce the data stored in the medium using a head. In recent years, medium storage devices are used for storing music and video data. Such medium storage devices are also used as storage devices of a host such as a personal computer by being connected to the host.

As illustrated in FIG. 8, a medium storage device (HDD) 110 is internally or externally connected to a host 100 such as a personal computer or a mobile computer.

When music is started to be reproduced in a host 100, the host 100 reads out music data from the medium storage device 110. In particular, as illustrated in FIG. 9, the host 100 issues read requests to the medium storage device 110 at regular intervals, and receives music data and a status STS from the medium storage device 110 for each of the read requests, to reproduce the music.

In other words, since music or video changes over time, a large amount of memory will be required to read the entire music data desired. Accordingly, the host 100 requests to sequentially read each portion of the music data.

The host 100 also uses the medium storage device 110 as a storage device for other processing of the host 100, while performing the music reproduction. For example, the host 100 may boot the operating system (OS) or may start an application after booting the OS, and perform processing for the OS or for the application while reproducing the music. In this case, the host 100 may issue a write request to the medium storage device 110 in response to an instruction corresponding to log processing of the OS or an instruction to copy data or the like by the application processing.

In writing data to the medium storage device, received write-data is once stored in a cache memory (or a buffer memory) 120 (see FIG. 8), then written on the medium with a head. When the writing fails, the write-data in the cache memory 120 are read out and written again on the medium with the head (write retry). This writing failure may be caused by vibration imparted on the device from outside or by an environmental change such as a change in the temperature.

When the device is under influence of such vibration or the like, the writing may not succeed even the write retry is repeated a number of times, as long as the device is kept under the influence of the vibration. Therefore, conventionally, when there is a possibility that the writing failure may occur due to the vibration or the like, the write-data stored in the cache memory is stored into another semiconductor memory without performing the write retry. Then, when the possibility is removed, the saved write-data is written to the medium with a head.

The aforementioned write retry delays any action in response to the read request of the host. As illustrated in FIG. 10, when the host 100 issues a read request R1 to the medium storage device 110, the medium storage device 110 reads out music data corresponding to requested number of sectors from the medium, stores the read out data into the cache memory, and then transfers the data to the host 100. Subsequently, when the host 100 issues a write request W1 to the medium storage device 110, the medium storage device 110 stores the write-data from the host 100 into the cache memory 120, and then writes the write-data to the medium with the head.

In the aforementioned case, if the writing fails due to vibration or the like, a write retry is performed. During the write retry, when an application for reproducing music or video is activated, the host 100 issues read requests for music data or the like at regular intervals, as described with reference to FIG. 9.

When an external storage device is mounted on a notebook personal computer and a loudspeaker of the notebook personal computer is provided near the external storage device for example, the external storage device is likely to be vibrated due to the operation of the loudspeaker for music reproduction or the like. If a write command is issued in a state where such vibration is frequently generated, the write retry is likely to be performed. As a result, the reading becomes impossible to be performed even if the read commands are received at regular intervals from the host 100.

Accordingly, as illustrated in FIG. 10, the reading in accordance with the read commands is delayed at the host 100 until the writing is completed. As a result, the reproduction of the music or moving images is interrupted.

SUMMARY

According to one embodiment, a storage device includes: a control circuit configured to perform a write retry when data writing fails, wherein the control circuit recognizes that read commands are issued at regular intervals for reproducing continuous pieces of data, and upon detecting an error requiring the write retry to be performed in the data writing by a write command received during the reproduction, the control circuit interrupts the data writing, perform data reading to store the data in the buffer memory after allocating a storage area for the data in the buffer memory, and then resumes the data writing.

BRIEF DESCRIPTION OF THE SEVERAL VIEWS OF THE DRAWINGS

A general architecture that implements the various features of the invention will now be described with reference to the drawings. The drawings and, the associated descriptions are provided to illustrate embodiments of the invention and not to limit the scope of the invention.

DETAILED DESCRIPTION

Various embodiments according to the invention will be described hereinafter with regard to a storage device, music reproduction recognition processing, read/write processing in a music reproduction mode and other embodiments in this order, with reference to the accompanying drawings. In general, according to one embodiment of the invention, a storage device comprises: a read/write mechanism configured to read data from a storage medium and write data to the storage medium with a head; a buffer memory configured to store the data; and a control circuit configured to perform a write retry when the data writing fails. The control circuit is configured to recognize that read commands are issued at regular intervals by a host for reproducing continuous pieces of data, and upon detecting an error requiring the write retry to be performed in the data writing by a write command received during the reproduction, the control circuit is configured to interrupt the data writing, perform the data reading to store the data in the buffer memory after allocating a storage area for the data in the buffer memory, and then resume the data writing.

According to another embodiment of the invention, a read/write processing method for a storage device, comprises: in response to a read command from a host, reading out data from a buffer memory or from a storage medium with a read/write mechanism, and transmitting the data to the host; in response to a write command from the host, storing data from the host in the buffer memory, subsequently writing the data on the storage medium with the read/write mechanism, and performing a write retry when the data writing fails; recognizing that the received read commands are issued at regular intervals by the host for reproducing continuous pieces of data; upon detecting an error requiring the write retry to be performed in the data writing by the write command received during the reproduction, interrupting the data writing; performing the data reading to store the data in the buffer memory after allocating a storage area for the data in the buffer memory; and resuming the data writing after the storing.

Figure 1:
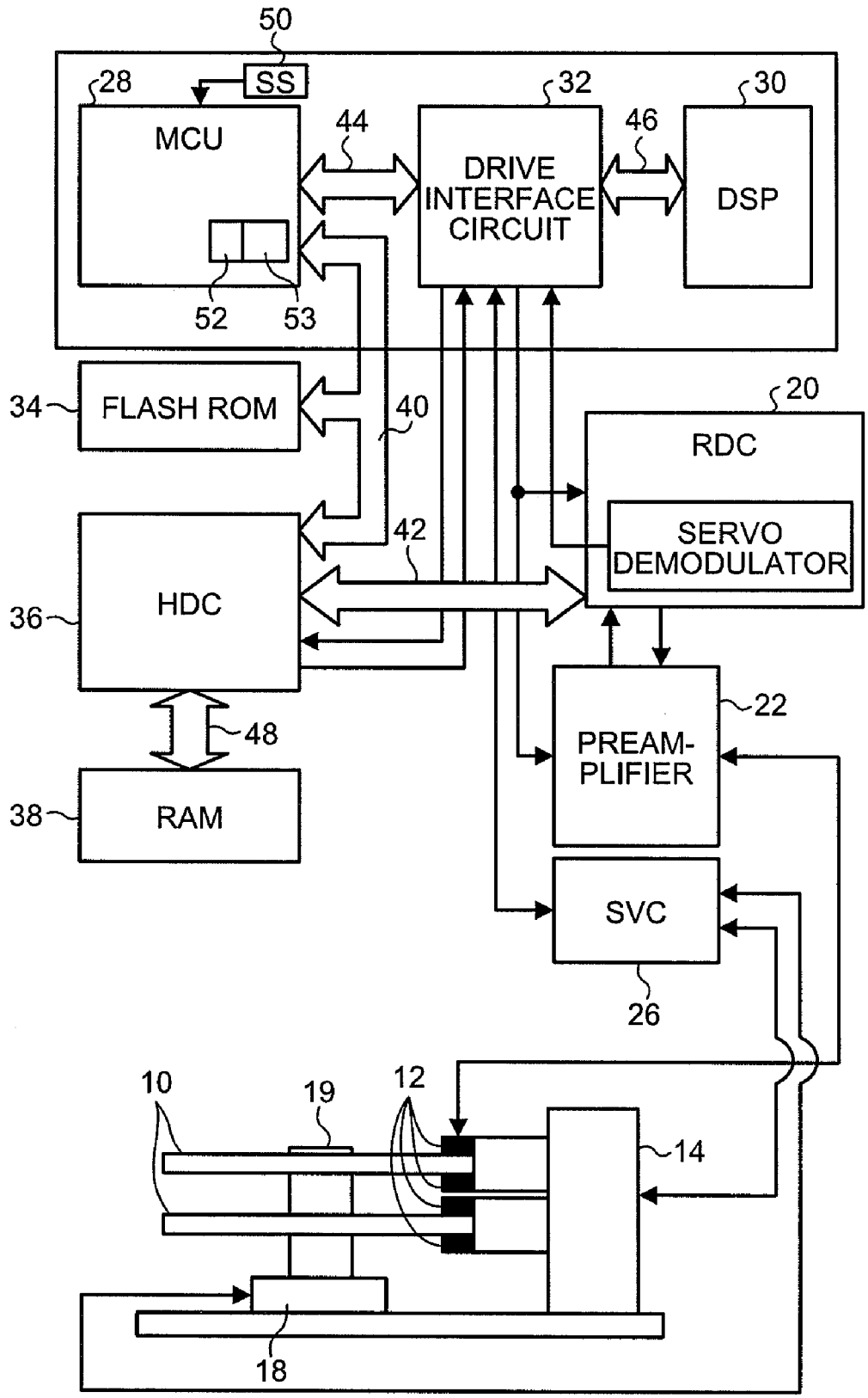
FIG. 1 is an exemplary block diagram of a medium storage device according to an embodiment of the invention.

FIG. 1 is a block diagram of a medium storage device according to an embodiment of the invention, and illustrates a magnetic disk device as the medium storage device. As illustrated in FIG. 1, a magnetic disk 10, which is a magnetic storage medium, is mounted on a rotating shaft 19 of a spindle motor 18. The spindle motor 18 rotates the magnetic disk 10. An actuator (VCM) 14 comprises a magnetic head 12 at an end thereof and moves the magnetic head 12 in a radial direction of the magnetic disk 10.

The actuator 14 is formed of a voice coil motor (VCM) that rotates about a rotating shaft. In the illustration of FIG. 1, two magnetic disks 10 are mounted on the magnetic disk device and four magnetic heads 12 are driven by the single actuator 14 at the same time.

The magnetic head 12 comprises a read element and a write element. The magnetic head 12 is formed by stacking a read element comprising a magneto-resistive (MR) element on a slider and stacking a write element comprising a write coil on the read element.

A preamplifier 22 transmits a write signal to the magnetic head 12, and amplifies a read signal from the magnetic head 12. A servo combo circuit 26 drives the spindle motor 18 and supplies a drive current to the voice coil motor (VCM) 14 to drive the VCM 14.

A read channel circuit 20 demodulates a servo signal among the read signals from the preamplifier 22 to obtain a position of the magnetic head 12. A controller comprises a microcontroller (MCU) 28, a digital signal processor (DSP) 30 and a drive interface circuit 32.

The DSP 30 detects a current position based on the position from the read channel circuit 20 obtained by demodulation, and calculates a VCM drive instruction value according to an error between the detected current position and a target position. In other words, the DSP 30 performs a servo control comprising a seek control and a following control.

The MCU 28 comprises a MPU, a read only memory (ROM) and a random access memory (RAM). The read only memory (ROM) stores a control program of the MPU and the like. The random access memory (RAM) stores data for processing at the MPU and the like. This MCU 28 performs music reproduction recognition processing, read/write processing, retry processing and the like, which will be described later.

The drive interface circuit 32 serves as a bridge between drive circuits (the read channel 20, the preamplifier 22 and the servo combo circuit 26) and the MCU 28, the DSP 30, and is connected with the MCU 28 via a first internal bus 44 and with the DSP 30 via a second internal bus 46.

A flash ROM 34 stores a boot program such as a microcode. A hard disk controller (HDC) 36 determines a position within one track using a sector number of a servo signal as a reference, and instructs recording/reproduction of data to the read channel 20.

Figure 8:
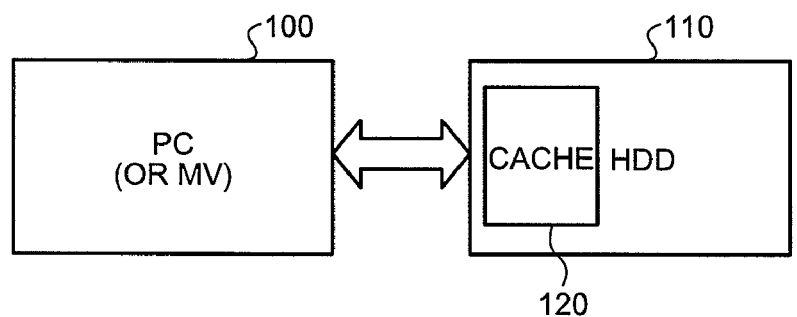
FIG. 8 is an exemplary block diagram of a system.
Figure 9:
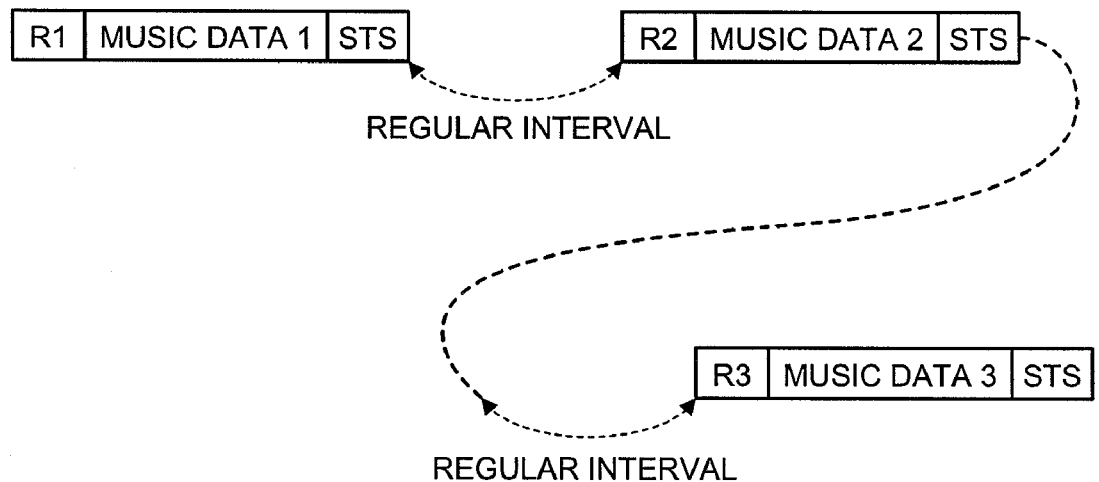
FIG. 9 is an exemplary explanatory diagram illustrating a timing for issuing a read command in music reproduction using the configuration of FIG. 1.
Figure 10:
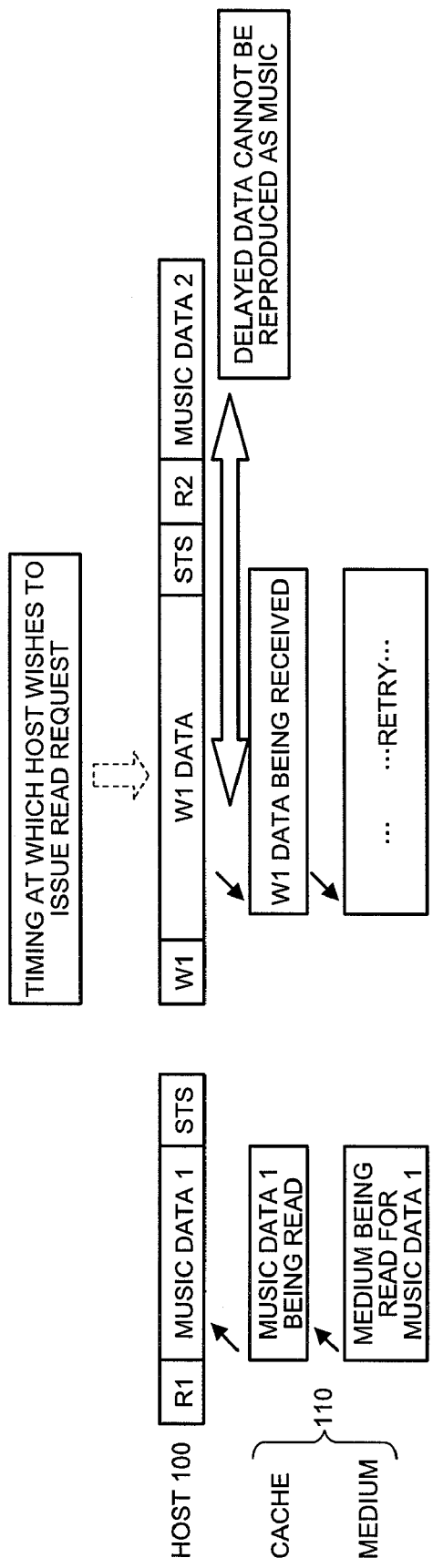
FIG. 10 is an exemplary explanatory diagram illustrating writing of write-data performed during music reproduction using the system of FIG. 8.

A RAM 38 for buffering (data buffer) is connected with the HDC 36 via a memory bus 48 and temporarily stores read-data and write-data. The HDC 36 communicates with the host 100 (see FIG. 8) via an interface IF such as a serial advanced technology attachment (SATA) and a small computer system interface (SCSI). A bus 40 connects the MCU 28, the flash ROM 34 and the HDC 36. The HDC 36 is connected to the read channel 20 via a data bus 42 for exchanging read-data and write-data.

In the configuration of FIG. 1, the HDC 36 exchanges data with the host 100 and the drive. Further, the DSP 30 performs a seek control and a following control of the magnetic head 12. Still further, the MCU 28 performs processing of controlling each module in accordance with a command received by the HDC 36.

A shock sensor (SS) 50 configured to detect vibration is connected to the MCU 28, and the MCU 28 detects that vibration is imparted to the device based on an output from the SS 50. The MCU 28 also comprises a music reproduction flag 52 which is turned on when the MCU 28 detects a music reproduction mode, and a retry state storage area 53 which indicates interruption of a write retry.

In a normal read operation, when the HDC 36 receives a command from the host 100, the HDC 36 or the MCU 28 analyzes the command. If the command is determined to be a read command as a result of the analysis, the HDC 36 determines whether target data of the read command is cached in the data buffer 38. When the target data is cached, the HDC 36 transfers the target data in the RAM 38 to the host 100.

On the other hand, when the target data is not cached in the data buffer 38, the HDC 36 requests the MCU 28 to read the medium. In response, the MCU 28 requests the DSP 30 to seek a sector of the read target data by the head. The DSP 30 performs servo control of the VCM 14 through the servo combo circuit 26, and positions the magnetic head 12 at a target track of the magnetic disk 10.

When the positioning is completed, the RDC 20 demodulates the read-data output from the magnetic head 12 (read element), and transfers the read-data to the HDC 36. The HDC 36 stores the transferred read-data in the buffer memory 38. When the buffer memory 38 has a read cache function, the read-data stored in the buffer memory 38 comprises not only data of a sector requested by the read command but also data of subsequent sectors. The HDC 36 takes out the target data from the read-data stored in the buffer memory 38, and transfers the target data to the host 100.

If the command is analyzed to be a write command, the HDC 36 receives write-data following the command from the host 100, and stores the write-data in the data buffer 38. Then, writing on the disk 10 is performed according to an instruction from the MCU 28. Specifically, the MCU 28 requests the DSP 30 to seek a write target sector by the head. The DSP 30 performs servo control of the VCM 14 through the servo combo circuit 26, and positions the magnetic head 12 at a target track of the magnetic disk 10.

When the positioning is completed, the HDC 36 transfers the write-data in the data buffer 38 to the RDC 20. The RDC 20 adds an ECC code or the like to the write-data, and applies a write current according to the write-data to the magnetic head 12 (write element) through the preamplifier 22. Thus, the write-data is written on the target sector of the magnetic disk 10.

During this write processing, the MCU 28 monitors a vibration detection signal from the SS 50, and the DSP 30 monitors a positional error of the magnetic head 12. When the MCU 28 detects the vibration of a predetermined level or higher and when the DSP 30 detects a positional error of a predetermined value or higher, the DSP 30 determines that the writing fails and stops the writing.

After the writing is stopped, the MCU 28 performs write retry. In the write retry, the aforementioned writing of the write-data is repeatedly performed. If the writing is not successful even though the write retry is repeated for a predetermined number of times, the host 100 is notified of an error.

In the embodiment, the MCU 28 recognizes whether a read request from the host 100 is a read request for music reproduction, and turns on/off the music reproduction flag 52, as will be described later. The MCU 28 also performs the reading/writing in music reproduction mode described later, when an error requiring the write retry to be performed occurs.

Figure 2:
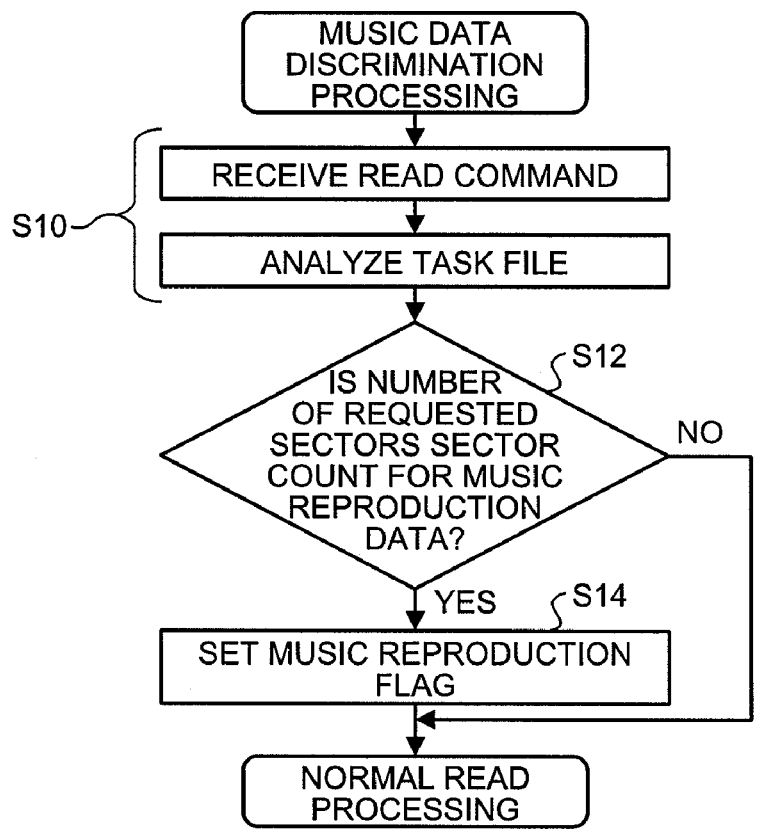
FIG. 2 is an exemplary flowchart of music reproduction recognition processing according to a first embodiment of the invention.

Recognizing processing of a music reproduction mode performed at the medium storage device will be described next. This processing allows the recognition of the music reproduction mode at the medium storage device side without requiring special processing of a music reproduction application at the host 100 side. FIG. 2 is a flowchart of the music reproduction recognition processing of a first embodiment of the invention.

When the MCU 28 determines that a read command is received, the MCU 28 analyzes a task file of a command block (S10). In the task file, the aforementioned command, a starting logical block address (LBA), the number of requested sectors and the like are described.

The MCU 28 determines whether the number of requested sectors in the task file corresponds to a number of sectors for music reproduction data (S12). Normally, in music reproduction, data of a fixed number of sectors are requested at regular time intervals. If the MCU 28 determines that the number of requested sectors in the task file does not correspond to the number of sectors for music reproduction data, the MCU 28 proceeds to normal read processing without turning on the music reproduction flag 52.

On the other hand, if the MCU 28 determines that the number of requested sectors corresponds to the number of sectors for music reproduction data, the host 100 is in the music reproduction mode. Therefore, the MCU 28 turns on the music reproduction flag 52, and proceeds to normal read processing (S14).

As described above, when the host 100 reproduces music, the number of requested sectors are fixed and differs from the number of normal sectors. Therefore, based on the number of requested sectors, it is possible to recognize at the medium storage device side that the host 100 is in the music reproduction mode.

Figure 3:
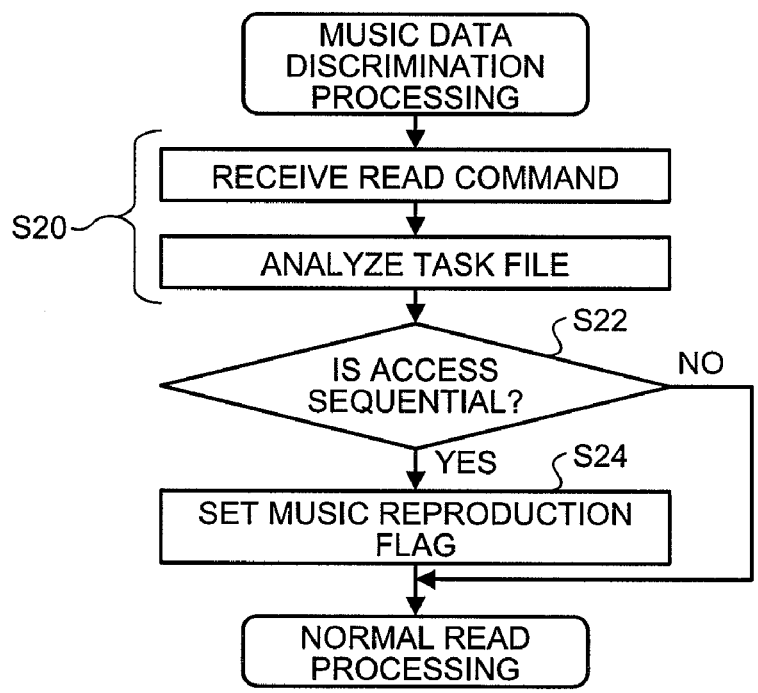
FIG. 3 is an exemplary flowchart of music reproduction recognition processing according to a second embodiment of the invention.

FIG. 3 is a flowchart of the music reproduction recognition processing of a second embodiment of the invention.

When the MCU 28 determines that a read command is received, the MCU 28 analyzes a task file of a command block (S20). In the task file, the aforementioned command, a starting LBA, the number of requested sectors and the like are described.

The MCU 28 determines whether the access is sequential (S22). Specifically, the MCU 28 determines whether the read commands are continuous over a predetermined time, and whether the read commands are issued at regular time intervals, based on a temporal relationship between a previously received read command and a currently received read command. As described above, normally in the music reproduction, pieces of data each with a fixed number of sectors are requested at regular time intervals. If the MCU 28 determines that the access is not sequential, the MCU 28 proceeds to normal read processing without turning on the music reproduction flag 52.

On the other hand, if the MCU 28 determines that the access is sequential, the host 100 is in the music reproduction mode. Therefore, the MCU 28 turns on the music reproduction flag 52, and proceeds to normal read processing (S24).

As described above, when the host 100 reproduces music, the host 100 issues the read commands at regular time intervals. Therefore, based on the time intervals of the read commands (command issuing pattern), it is possible to recognize at the medium storage device side that the host 100 is in the music reproduction mode.

Figure 4:
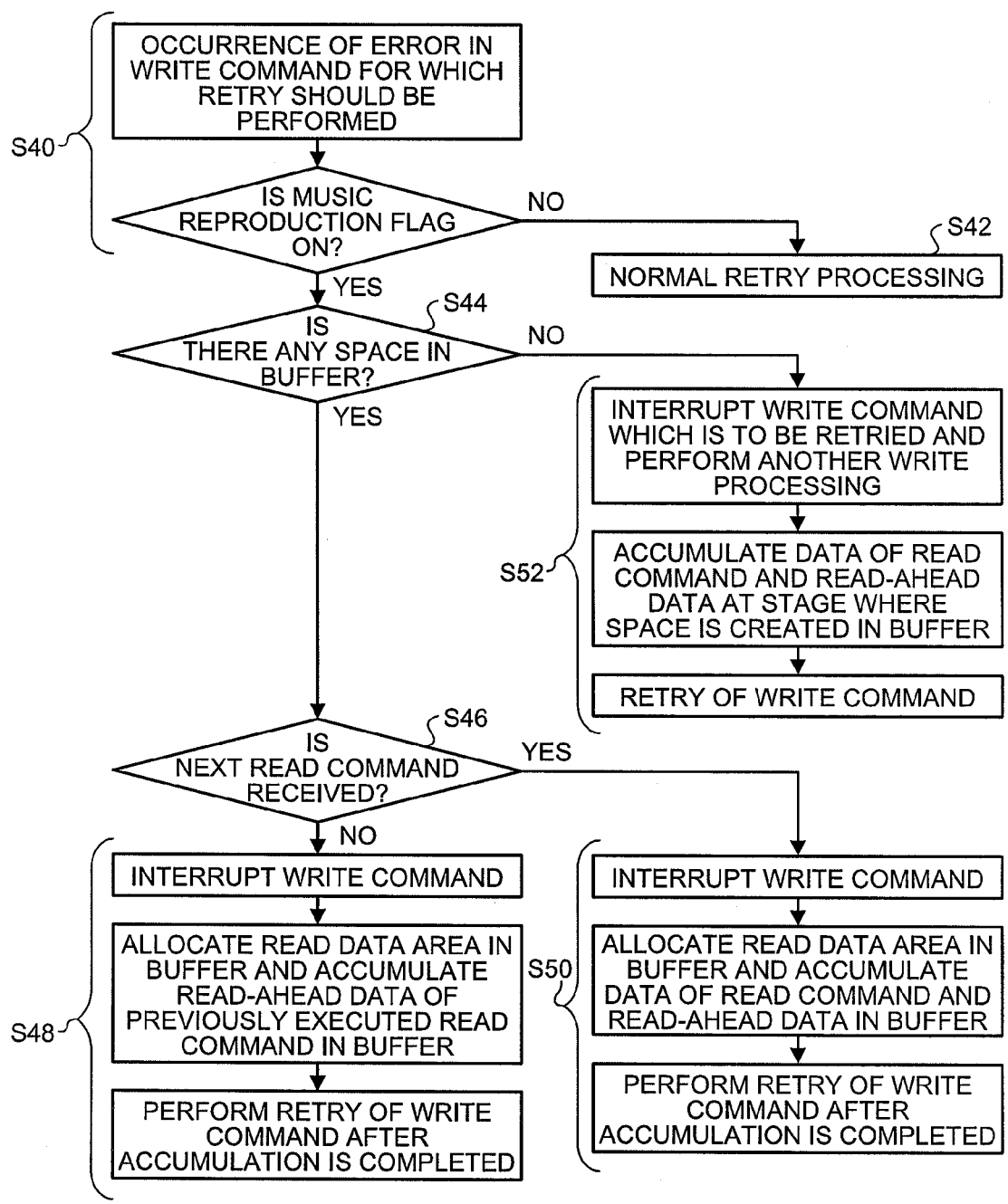
FIG. 4 is an exemplary flowchart of reading of read-data when write retry is performed in the first embodiment.
Figure 5:
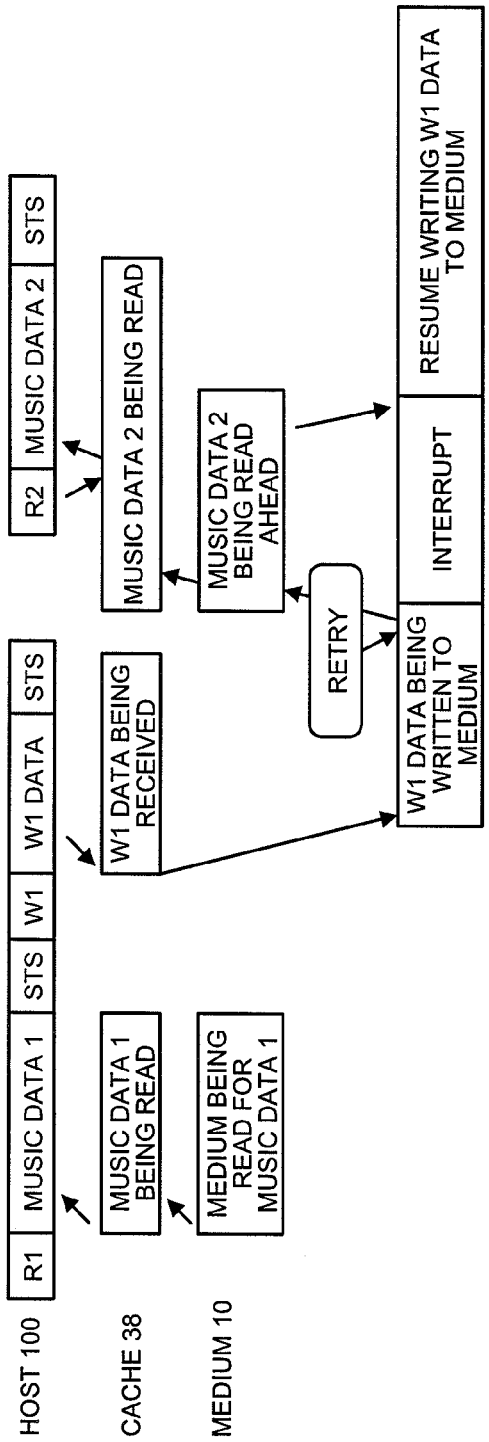
FIG. 5 is an exemplary explanatory diagram of first reading of the read-data when the write retry is performed in the first embodiment.
Figure 6:
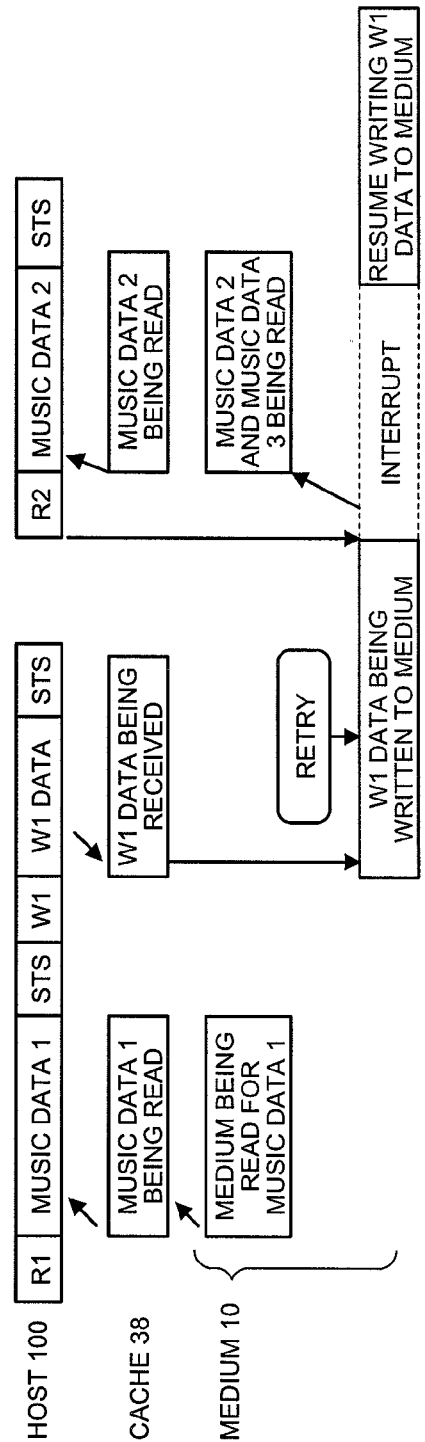
FIG. 6 is an exemplary explanatory diagram of second reading of the read-data when the write retry is performed in the first embodiment.
Figure 7:
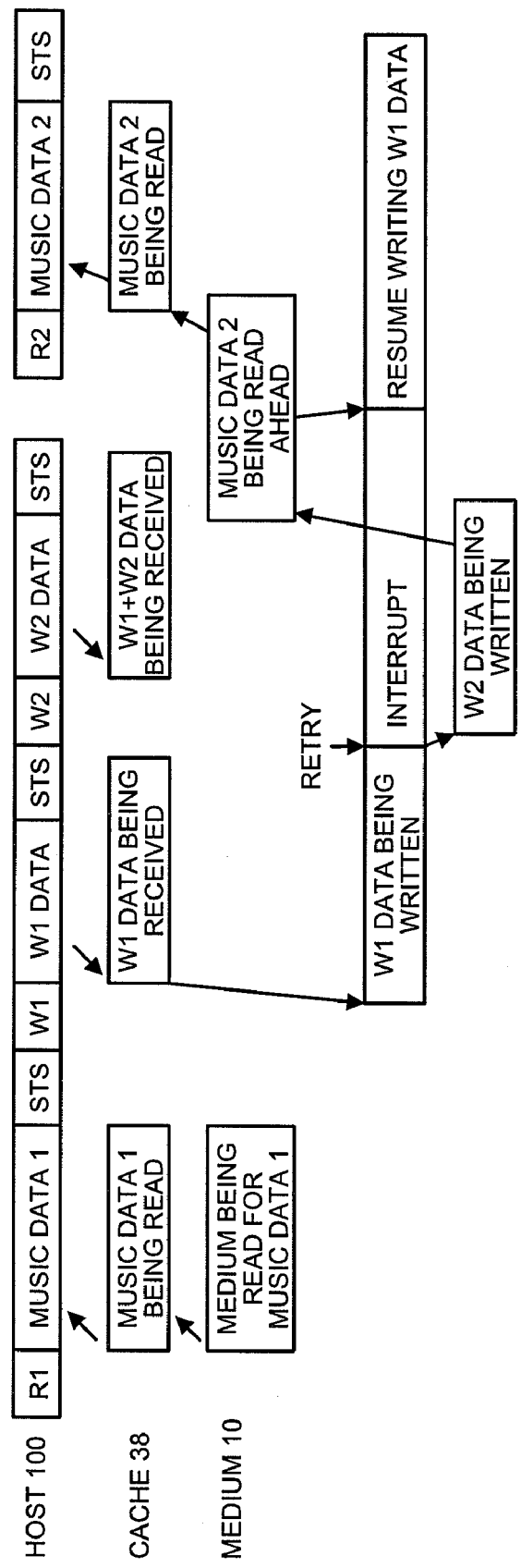
FIG. 7 is an exemplary explanatory diagram of third reading of the read-data when the write retry is performed in the first embodiment.

FIG. 4 is a flowchart of read/write processing when an error requiring a write retry to be performed occurs according to an embodiment of the invention; FIG. 5 is an explanatory diagram for first read processing in FIG. 4; FIG. 6 is an explanatory diagram for second read processing in FIG. 4; and FIG. 7 is an explanatory diagram for third read processing in FIG. 4.

If the MCU 28 detects the error corresponding to a write command requiring the write retry to be performed, the MCU 28 determines whether the music reproduction flag 52 is turned on (S40).

When the music reproduction flag 52 is not turned on, the host 100 is not reproducing music. Therefore, the MCU 28 activates normal write retry processing, and terminates the operation (S42).

When the music reproduction flag 52 is turned on, the host 100 is reproducing music. Therefore, the MCU 28 determines whether there is any available space in the data buffer 38 (S44).

When the MCU 28 determines that there is a space in the data buffer 38, the MCU 28 determines whether a next read command is already received (S46).

When the MCU 28 determines that the next read command is not received yet, the MCU 28 reads ahead the read-data in preparation for the next read command, as illustrated in FIG. 5 (S48). Specifically, the MCU 28 interrupts the processing of the write command. Subsequently, the MCU 28 allocates a read data area in the data buffer 38.

Then, the MCU 28 reads ahead read-data subsequent to the requested read-data corresponding to the read command previously executed (R1 in FIG. 5) from the disk 10 by using the head 12, and stores the next requested read-data in the allocated area in the data buffer 38. Then, after completion of the read-ahead processing, the MCU 28 performs a write retry of the write command.

On the other hand, when the MCU 28 determines that the next read command is already received, the MCU 28 reads the read-data corresponding to the already-received next read command and further reads ahead read data of read command subsequent to the next read command already received, as illustrated in FIG. 6 (S50).

Specifically, the MCU 28 interrupts the processing of the write command. Subsequently, the MCU 28 allocates a read data area in the data buffer 38, reads the requested read-data of the received read command (R2 in FIG. 6) and the requested read-data of the next read command from the disk 10 by using the head 12, and stores the requested read-data in the allocated area in the data buffer 38. After completion of the read processing, the MCU 28 performs the write retry of the write command.

When the MCU 28 determines in S44 that there is no space in the data buffer 38, a plurality of write commands and corresponding pieces of write data are received, as illustrated in FIG. 7. Therefore, the read processing as in S48, S50 cannot be performed. Thus, an available space is created in the data buffer 38 (S52).

Specifically, the MCU 28 interrupts the write command resulting in the error necessitating the write retry. Then, the MCU 28 performs write processing of other received write command (W2 in FIG. 7). When the write processing is completed, the write-data of the write command in the data buffer 38 becomes unnecessary, thus can be overwritten. That is, an available space is created in the data buffer 38. The MCU 28 allocates a read data area in the data buffer 38, reads the requested read-data of the next read command (R2 in FIG. 7) and the requested read-data of a further next read command from the disk 10 by using the head 12, and stores the requested read-data in the allocated area in the data buffer 38. After completion of the read processing, the MCU 28 performs the write retry of the interrupted write command.

The embodiment will be specifically described with reference to FIGS. 5 to 7. During music reproduction, the MCU 28 receives a write command W1 and write data from the host 100, stores the write command and the write data in the buffer memory 38 and performs write processing. In performing the write processing, when the MCU 28 detects an error requiring a write retry to be performed (for example, the aforementioned detection of vibration or a detection of an off-track), the MCU 28 interrupts the write processing. Then, the MCU 28 determines whether there is any space for storing read-data in the data buffer 38, and performs read processing if there is a space.

In this case, read processing differs for the case when the next read command is received at the time of occurrence of the error and when the next command is not received at the time of occurrence of the error. Specifically, when the next read command is not received, only the read-data for the next read command R2 to be received in the future is read ahead, and stored in the data buffer 38, as illustrated in FIG. 5. Then, when the next read command R2 is received, the MCU 28 transfers the read-data in the data buffer 38 to the host 100, and reports the status.

On the other hand, when the next read command is already received, the MCU 28 reads the read-data for the next read command R2 which is already received, reads ahead the read-data for next read command R3, and stores the read-data in the data buffer 38, as illustrated in FIG. 6. After the reading, the MCU 28 transfers the read-data in the data buffer 38 for the read command R2 to the host 100, and reports the status.

In other words, the amount of the reading is controlled depending on whether the read command is already received at the time of occurrence of the error. If the read command is already received, there is a possibility that the write retry is not completed by the time the next read command is received, and therefore, the read data for the further next read command are read ahead.

On the other hand, if the read command is not yet received, there is a possibility that the write retry is completed (comprising a retry over) by the time when the next read command is received. Therefore, the read-data for the next read command is not read ahead. In this manner, the buffer size may be decreased by an amount corresponding to the amount of read data for the next read command, and the time for read processing can be shortened.

Further, there is a possibility that there is no space in the data buffer 38 when the error requiring the retry to be performed occurs. In other words, a plurality of write commands and write-data are received, thereby no space in the data buffer 38, as illustrated in FIG. 7. In this case, the read processing as in S48, S50 cannot be performed. Therefore, an available space is created in the data buffer 38.

This is achieved as follows. First, the processing of the write command W1 to be retried is interrupted and write processing of another write command W2 is performed. If there is a plurality of other write commands, a write command for which the number of processing blocks is the smallest is selected so as to shorten the time for the write processing. When the write processing is successful, a space is created in the data buffer 38, and accordingly, read-data for the next read command R2 is read ahead into the data buffer 38. Then, when the next read command R2 is received, the MCU 28 transfers the read-data in the data buffer 38 to the host 100, and reports the status.

As the command, a native command queuing (NCQ) command of the SATA may be preferably used.

In the embodiments described above, an example in which the medium storage device is applied to a magnetic disk device is described, but the medium storage device may also be applied to other disk devices such as an optical disk device or devices using a rotating storage medium. In addition, the configuration of the controller is described using the illustration of FIG. 1, but a controller having another configuration may be applied.

Further, an example in which three types of read processing are combined is described with reference to FIG. 4, but one type of read processing may be independently employed depending on the intervals of read commands for music/video reproduction or requested data of one command. The embodiments are described using examples of music reproduction, but the embodiments may also be applied to reproduction of other sequential data such as reproduction of moving pictures such as video.

According to any one of the embodiments, the host recognizes that the received read commands are issued at regular intervals for reproducing continuous pieces of data. Then, when the error requiring the write retry to be performed occurs in the writing by the received write command during the reproduction, the storage area for the read data is allocated in the data buffer. Next, the reading of the read-data is performed, and then the writing of the write-data is resumed. Consequently, the delay in receiving the read command and the delay in processing the read command due to the delay in processing the write command transmitted between the read commands while reproducing music or video can be prevented, and the interruption in reproducing music or video can be avoided.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A storage device comprising:
   a reader and writer configured to read data from a storage medium and to write data to the storage medium with a head;
   a buffer memory configured to store the data; and
   a controller configured to retry data writing data if the data writing was unsuccessful, wherein
   the controller is further configured to detect whether a host has received read commands issued at regular intervals for reproducing continuous data, and
   wherein the controller is further configured to interrupt the data writing, to read data in response to the read commands, to allocate a storage area for the data in the buffer memory, to store the data in the buffer memory, and to resume the data writing, if the controller detects an error in the data writing by a write command received during the reproduction.

2. The storage device of claim 1, wherein the controller is configured to determine whether a space for storing the data is available in the buffer memory when the controller detects the error, and the controller is configured to read the data after the allocation of the storage area if the space is available in the buffer memory.

3. The storage device of claim 1, wherein the controller is configured to determine whether a read command of the read commands to be processed next has been received, and the control circuit is configured to allocate the storage area for data in the read command to be processed next, if the read command to be processed next has not been received yet, and to read the data once the read command to be processed next has been received.

4. The storage device of claim 1, wherein the controller is configured to determine whether a read command to be processed next of the read commands has been received, and the controller is configured to allocate the storage area for data of the read command to be processed next and for data of a read command subsequent to the read command to be processed next when the read command to be processed next has been received, and to read the data.

5. The storage device of claim 2,
   wherein the buffer is configured to store data of the write command first, and the storage medium is configured to store the data, during the data writing, and
   wherein the controller is configured to write the data with a write command which is not the write command corresponding to the retry of writing while allocating the storage area for a read command to be processed next, and to read the data when the space is unavailable in the buffer memory.

6. The storage device of claim 1, wherein the controller is configured to detect the read commands based on a data size requested by the read command.

7. The storage device of claim 1, wherein the controller is configured to detect the read commands by analyzing issue patterns in the issued read commands.

8. The storage device of claim 1, wherein the controller is configured to determine the error by at least one of detection of vibration on the device and a positional error of the head during the writing.

9. The storage device of claim 1, wherein the reader and writer comprises:
   a head configured to read the data from the storage medium and to write the data to the storage medium; and
   an actuator configured to position the head at a target track of the storage medium.

10. A data reading and writing method for a storage device, comprising:
    reading out data from a buffer memory or from a storage medium with a reader and writer in response to a read command from a host, and transmitting the data to the host;
    storing data from the host in the buffer memory in response to a write command from the host, and subsequently writing the data on the storage medium with the reader and writer, and retrying to write when the data writing fails;
    detecting that the received read commands are issued at regular intervals by the host for reproducing continuous data;
    interrupting the data writing upon detecting an error in the data writing by the write command received during the reproduction;
    reading the data, allocating a storage area for the data in the buffer memory, and storing the data in the buffer memory; and
    resuming the data writing after the storing.

11. The data reading and writing method of claim 10, wherein the storing comprises:
    determining whether a space for storing the data is available in the buffer memory when the error is detected; and reading the data after the allocation of the storage area when the space is available in the buffer memory.

12. The data reading and writing method of claim 10, wherein the storing comprises:
   determining whether a read command to be processed next of the read commands has been received; and
   allocating the storage area for data of the read command to be processed next, if the read command to be processed next has not been received yet and reading the data once the read command to be processed next has been received.

13. The data reading and writing method of claim 10, wherein the storing comprises:
   determining whether a read command to be processed next of the read commands has been received; and
   allocating the storage area for data of the read command to be processed next and for data of a read command subsequent to the read command to be processed next when the read command to be processed next has been received, and reading the data.

14. The data reading and writing method of claim 11, further comprising:
   writing the data by a received write command which is not the write command corresponding to the retry of writing when the space is unavailable in the buffer memory; and
   allocating the storage area for a read command to be processed next, and reading the data.

15. The data reading and writing method of claim 10, wherein the recognizing recognizes the reproduction based on a data size requested by the read command.

16. The data reading and writing method of claim 10, further comprising detecting the read commands by analyzing patterns in the issued read commands.

17. The data reading and writing method of claim 10, wherein the interrupting comprises determining the error by at least one of detection of vibration on the device and a positional error of the head during the writing.

18. The data reading and writing method of claim 10, wherein the reader and writer comprises:
   a head configured to read the data from the storage medium and to write the data to the storage medium; and
   an actuator configured to position the head at a target track of the storage medium.

* * * * *